US012703396B2

(12) United States Patent
Lu et al.

(10) Patent No.: US 12,703,396 B2
(45) Date of Patent: Aug. 11, 2026

(54) UNKNOWN DRIVING HAZARD DETECTION AND RESPONSE SYSTEM

(71) Applicant: GM Cruise Holdings LLC, San Francisco, CA (US)

(72) Inventors: Jing Lu, San Francisco, CA (US); Xingwei Wu, Sunnyvale, CA (US); Nanyan Zhu, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 116 days.

(21) Appl. No.: 18/401,898

(22) Filed: Jan. 2, 2024

(65) Prior Publication Data

US 2025/0214624 A1 Jul. 3, 2025

(51) Int. Cl.
*B60W 60/00* (2020.01)
*B60W 50/00* (2006.01)
*G01C 21/28* (2006.01)

(52) U.S. Cl.
CPC .... *B60W 60/0016* (2020.02); *B60W 50/0097* (2013.01); *G01C 21/28* (2013.01); *B60W 2554/4046* (2020.02)

(58) Field of Classification Search
None
See application file for complete search history.

(56) References Cited

U.S. PATENT DOCUMENTS

2019/0011910 A1* 1/2019 Lockwood ........... G05D 1/0038
2019/0101924 A1* 4/2019 Styler ..................... G06V 20/56
2019/0138007 A1* 5/2019 Baghsorkhi .............. G08G 1/16
2019/0179324 A1* 6/2019 Rottkamp .......... G08G 1/09675
2019/0193741 A1* 6/2019 Hitomi ............. G08G 1/096791
2019/0270408 A1* 9/2019 Castro ...................... B60Q 9/00
2022/0161823 A1* 5/2022 Domeyer ................. G06N 3/08

* cited by examiner

*Primary Examiner* — Hunter B Lonsberry
*Assistant Examiner* — Henry R Hinton
(74) *Attorney, Agent, or Firm* — Honigman LLP; Matthew H. Szalach

(57) ABSTRACT

A system installed on an autonomous vehicle (AV) is described and includes an unknown driving hazard detection module configured to detect an unusual driving behavior of at least one road participant operating in proximity to the AV, wherein the unusual driving behavior comprises a deviation from a behavior of the at least one road participant as predicted by the AV; and an unknown driving hazard response module configured to cause an action to be performed in connection with the AV based on the detected unusual driving behavior.

20 Claims, 5 Drawing Sheets

UNKNOWN DRIVING HAZARD DETECTION AND RESPONSE SYSTEM

TECHNICAL FIELD

The present disclosure relates generally to autonomous vehicles (AVs) and, more specifically, to techniques for detection of and response to unknown driving hazards encountered by such AVs.

BACKGROUND

Introduction

An AV is a motorized vehicle that can navigate without a human driver. AVs include computers and control systems that perform driving and navigation tasks that are conventionally performed by a human driver. Such tasks require the collection and processing of large quantities of data using various sensors, including but not limited to, a camera sensor, a light detection and ranging (LIDAR) sensor, and a radio detection and ranging (RADAR) sensor, among others. The sensors collect data and measurements that the AV can use for operations such as navigation. The sensors can provide the data and measurements to an internal computing system of the AV, which can use the data and measurements to control a mechanical system of the AV, such as a vehicle propulsion system, a braking system, or a steering system. Typically, the sensors are mounted at fixed locations on the AVs.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Overview

Figure 1:
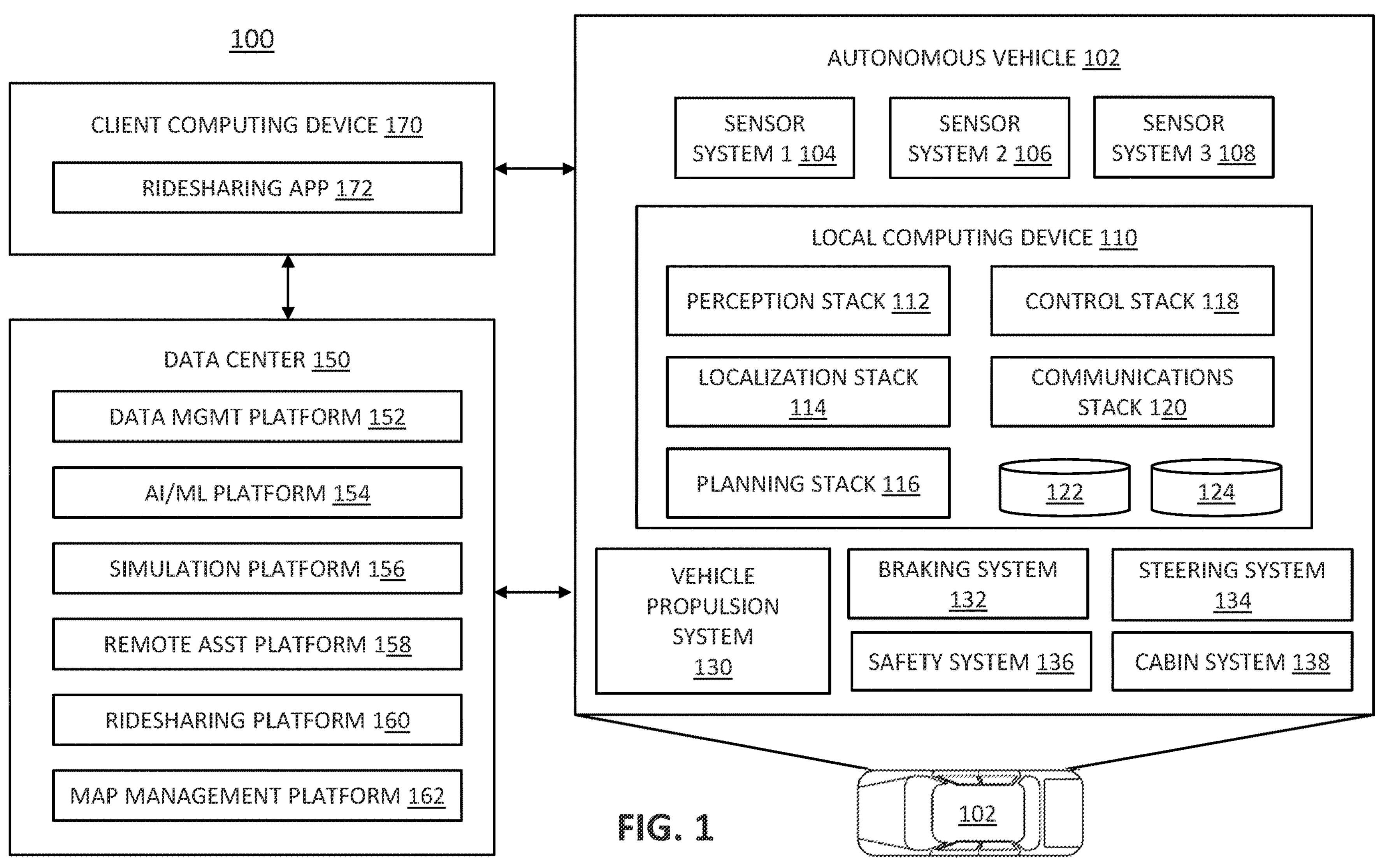
FIG. 1 illustrates an example system environment that can be used to facilitate AV (AV) dispatch and operations, according to some aspects of the disclosed technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Given the numerous advantages of ride hail, rideshare, and delivery services (hereinafter collectively referred to as rideshare services) provided by fleets of AVs, it is anticipated that AV provision of such services will soon become the ubiquitous choice for various user transportation and delivery needs, including but not limited to school commutes, airport transfers, long distance road trips, and grocery and restaurant deliveries, to name a few.

As AV fleets expand and accumulate more miles, an AV is more likely to encounter driving situations that neither the AV nor other AVs in the fleet have previously encountered. Some such unknown driving situations may directly impact safety of the AV and those around the AV, including other road participants (which may be referred to herein as road users, or NPCs) and may therefore constitute hazards. Unknown driving situations may present particular challenges in that, by definition, the AV stack has not been trained on how to respond to such situations; therefore, the AV needs to be able to assess the potential safety hazard posed by the unknown driving situation and then respond on-the-fly.

In accordance with features of embodiments described herein, the collective behavior of NPCs in the vicinity of an AV may be perceived by the AV and used to detect and assess the existence of an unknown hazard. Once such an unknown hazard is detected, various safety responses may be initiated. Such safety responses may be based on the assessment of the collective behavior of the NPCs, as other perception information as available. In particular embodiments, the data regarding the situation may be logged and used for training the AV stack such that the information gleaned from the situation may be distributed across the AV fleet, eventually turning an unknown driving situation into a known driving situation with a predictable AV response.

Embodiments described herein enable detection of unknown driving hazards based on the collective situational awareness of surrounding traffic. Particular embodiments may enable implementation of immediate evasive strategy through mimicking of the behavior of surrounding traffic, triggering a safe stop, and/or causing the AV to enter a cautious driving mode based on the collective situational awareness of surrounding traffic. Additionally and/or alternatively, a remote assistance (RA) session may be proactively triggered to mitigate and/or avoid potentially hazardous situations.

The following detailed description presents various descriptions of specific certain embodiments. However, the innovations described herein can be embodied in a multitude of different ways, for example, as defined and covered by the claims and/or select examples. In the following description, reference is made to the drawings, in which like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the drawings, a particular number and arrangement of structures and components are presented for illustrative purposes and any desired number or arrangement of such structures and components may be present in various embodiments. Further, the structures shown in the figures may take any suitable form or shape according to material properties, fabrication processes, and operating conditions. For convenience, if a collection of drawings designated with different letters are present (e.g., FIGS. 10A-10C), such a collection may be referred to herein without the letters (e.g., as "FIG. 10"). Similarly, if a collection of reference numerals designated with different letters are present (e.g., 110*a*-110*e*), such a collection may be referred to herein without the letters (e.g., as "110").

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y. The terms "substantially," "close," "approximately," "near," and "about," generally refer to being within +/−20% of a target value (e.g., within +/−5 or 10% of a target value) based on the context of a particular value as described herein or as known in the art.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Other features and advantages of the disclosure will be apparent from the following description and the claims.

Example AV Management System

FIG. 1 illustrates an example of an AV management system 100. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 100 includes an AV 102, a data center 150, and a client computing device 170, which in some embodiments may comprise an ADSC. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 102 can navigate roadways without a human driver based on sensor signals generated by multiple sensor systems 104, 106, and 108. The sensor systems 104-108 can include different types of sensors and can be arranged about the AV 102. For instance, the sensor systems 104-108 can comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other embodiments may include any other number and type of sensors.

AV 102 can also include several mechanical systems that can be used to maneuver or operate AV 102. For instance, the mechanical systems can include vehicle propulsion system 130, braking system 132, steering system 134, safety system 136, and cabin system 138, among other systems. Vehicle propulsion system 130 can include an electric motor, an internal combustion engine, or both. The braking system 132 can include an engine brake, a wheel braking system (e.g., a disc braking system that utilizes brake pads), hydraulics, actuators, and/or any other suitable componentry configured to assist in decelerating AV 102. The steering system 134 can include suitable componentry configured to control the direction of movement of the AV 102 during navigation. Safety system 136 can include lights and signal indicators, a parking brake, airbags, and so forth. The cabin system 138 can include cabin temperature control systems, in-cabin entertainment systems, and so forth. In some embodiments, the AV 102 may not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

AV 102 can additionally include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a planning stack 116, a control stack 118, a communications stack 120, a High Definition (HD) geospatial database 122, and an AV operational database 124, among other stacks and systems.

Perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 122, other components of the AV, and other data sources (e.g., the data center 150, the client computing device 170, third-party data sources, etc.). The perception stack 112 can detect and classify objects and determine their current and predicted locations, speeds, directions, and the like. In addition, the perception stack 112 can determine the free space around the AV 102 (e.g., to maintain a safe distance from other objects, change lanes, park the AV, etc.). The perception stack 112 can also identify environmental uncertainties, such as where to look for moving objects, flag areas that may be obscured or blocked from view, and so forth.

Mapping and localization stack 114 can determine the AV's position and orientation (pose) using different methods from multiple systems (e.g., GPS, IMUs, cameras, LIDAR, RADAR, ultrasonic sensors, the HD geospatial database 122, etc.). For example, in some embodiments, the AV 102 can compare sensor data captured in real-time by the sensor systems 104-108 to data in the HD geospatial database 122 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The planning stack 116 can determine how to maneuver or operate the AV 102 safely and efficiently in its environment. For example, the planning stack 116 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, DPVs, etc.), traffic rules and other safety standards or practices for the road, user input, and other relevant data for directing the AV 102 from one point to another. The planning stack 116 can determine multiple sets of one or more mechanical operations that the AV 102 can perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 116 can select from multiple backup plans to carry out. For example, while preparing to change lanes to turn right at an intersection, another vehicle may aggressively cut into the destination lane, making the lane change unsafe. The planning stack 116 could have already determined an alternative plan for such an event, and upon its occurrence, help to direct the AV 102 to go around the block instead of blocking a current lane while waiting for an opening to change lanes.

The control stack 118 can manage the operation of the vehicle propulsion system 130, the braking system 132, the steering system 134, the safety system 136, and the cabin system 138. The control stack 118 can receive sensor signals from the sensor systems 104-108 as well as communicate with other stacks or components of the local computing device 110 or a remote system (e.g., the data center 150) to effectuate operation of the AV 102. For example, the control stack 118 can implement the final path or actions from the multiple paths or actions provided by the planning stack 116. This can involve turning the routes and decisions from the planning stack 116 into commands for the actuators that control the AV's steering, throttle, brake, and drive unit.

The communication stack 120 can transmit and receive signals between the various stacks and other components of the AV 102 and between the AV 102, the data center 150, the client computing device 170, and other remote systems. The communication stack 120 can enable the local computing device 110 to exchange information remotely over a network, such as through an antenna array or interface that can provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 120 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 122 can store HD maps and related data of the streets upon which the AV 102 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/ permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The AV operational database 124 can store raw AV data generated by the sensor systems 104-108 and other components of the AV 102 and/or data received by the AV 102 from remote systems (e.g., the data center 150, the client computing device 170, etc.). In some embodiments, the raw AV data can include HD LIDAR point cloud data, image or video data, RADAR data, GPS data, and other sensor data that the data center 150 can use for creating or updating AV geospatial data.

The data center 150 can be a private cloud (e.g., an enterprise network, a co-location provider network, etc.), a public cloud (e.g., an IaaS network, a PaaS network, a SaaS network, or other CSP network), a hybrid cloud, a multi-cloud, and so forth. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes one or more of a data management platform 152, an Artificial Intelligence/Machine Learning (AI/ML) platform 154, a simulation platform 156, a remote assistance platform 158, a ridesharing platform 160, and a map management platform 162, among other systems.

Data management platform 152 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the map management platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from the map management platform 162; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general purpose computing device for accessing the ridesharing application 172. The client computing device 170 can be a customer's mobile computing device or a computing device integrated with the AV 102 (e.g., the local computing device 110). The ridesharing platform 160 can receive requests to be picked up or dropped off from the ridesharing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as tracking specific changes that (human or machine) map editors have made to the data and reverting changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some embodiments, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ridesharing platform 160 may incorporate the map viewing services into the client application 172 to enable passengers to view the AV 102 in transit en route to a pick-up or drop-off location, and so on.

Example Techniques for Unknown Driving Hazard Detection and Response

In operation, an AV may predict the short term trajectories of NPCs operating in the vicinity of the AV using prediction models trained using past road data. In normal operational situations, such prediction models work well and there are at worst minor discrepancies between the projected (or predicted) trajectory of an NPC and the actual path followed by, or realized trajectory of, the NPC. If at a given point in time, the trajectories predicted by an AV for a number of NPCs differ from the realized trajectories of the NPCs by a significant amount, it would appear that something is amiss and that either there is a problem with the prediction models or that the NPCs are reacting to an unusual situation (e.g., the approach of an emergency vehicle (EMV) or a road obstacle that is not yet within the AVs line of sight). While it is possible that there is a problem with the prediction models, the more likely cause of the noted discrepancies is that the NPCs are exhibiting a collective response to an unusual driving situation that may pose an as yet undetected hazard to the AV.

Figure 2:
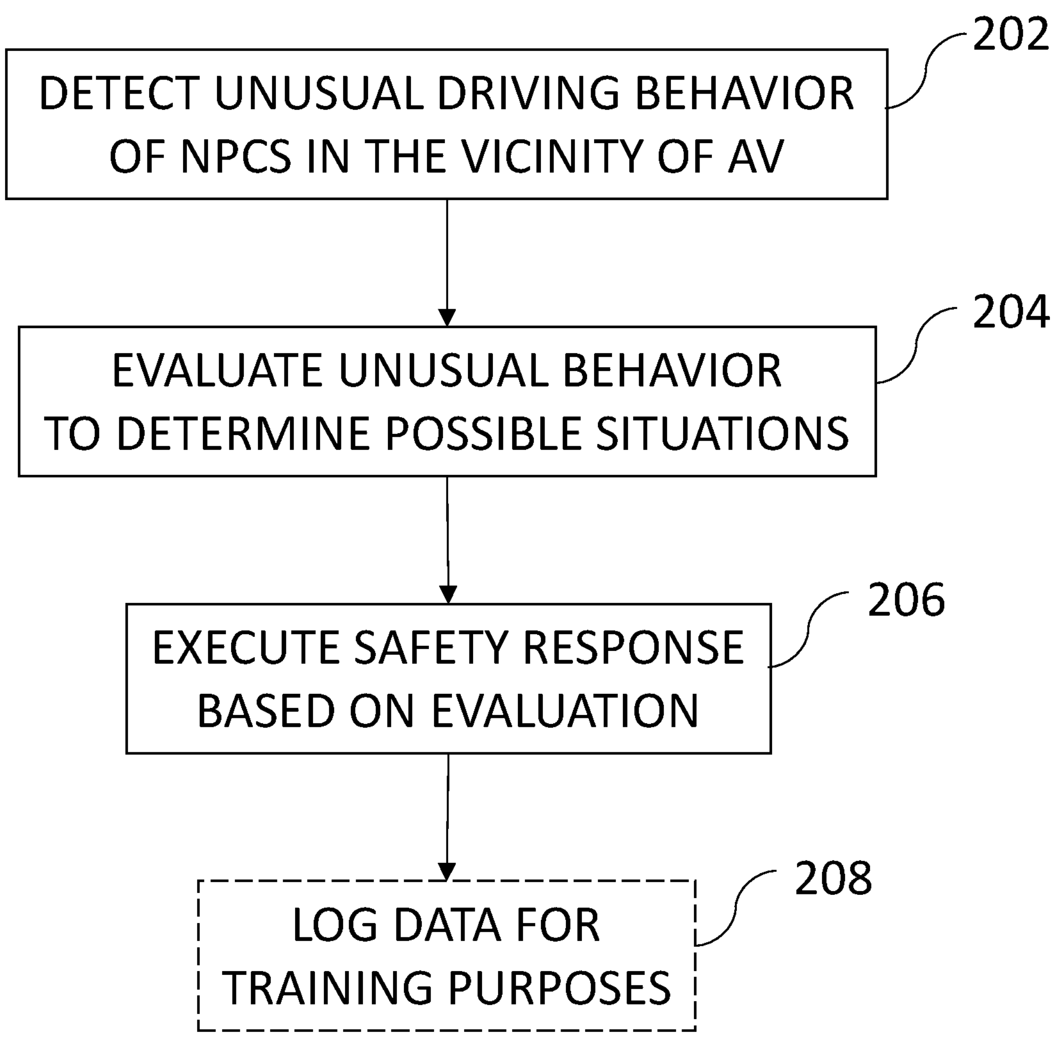
FIG. 2 is a flowchart illustrating example operations that may be performed by an unknown driving hazard detection and response system according to some aspects of the disclosed technology.

FIG. 2 is a flowchart 200 illustrating example operations that may be performed in accordance with particular embodiments for detecting and responding to an unknown driving hazard. In certain embodiments, one or more of the operations illustrated in FIG. 2 may be executed by one or more of the elements shown in FIG. 1 and/or FIG. 4 below.

At 202, unusual behavior of NPCs operating in the vicinity of/in proximity to the AV may be detected by the AV. Examples of unusual NPC behavior are described with reference to FIGS. 3A and 3B. Examples of unusual NPC behavior in addition to those illustrated and described with reference to FIGS. 3A and 3B may include NPCs collectively braking, accelerating, or steering aside.

Figure 3A:
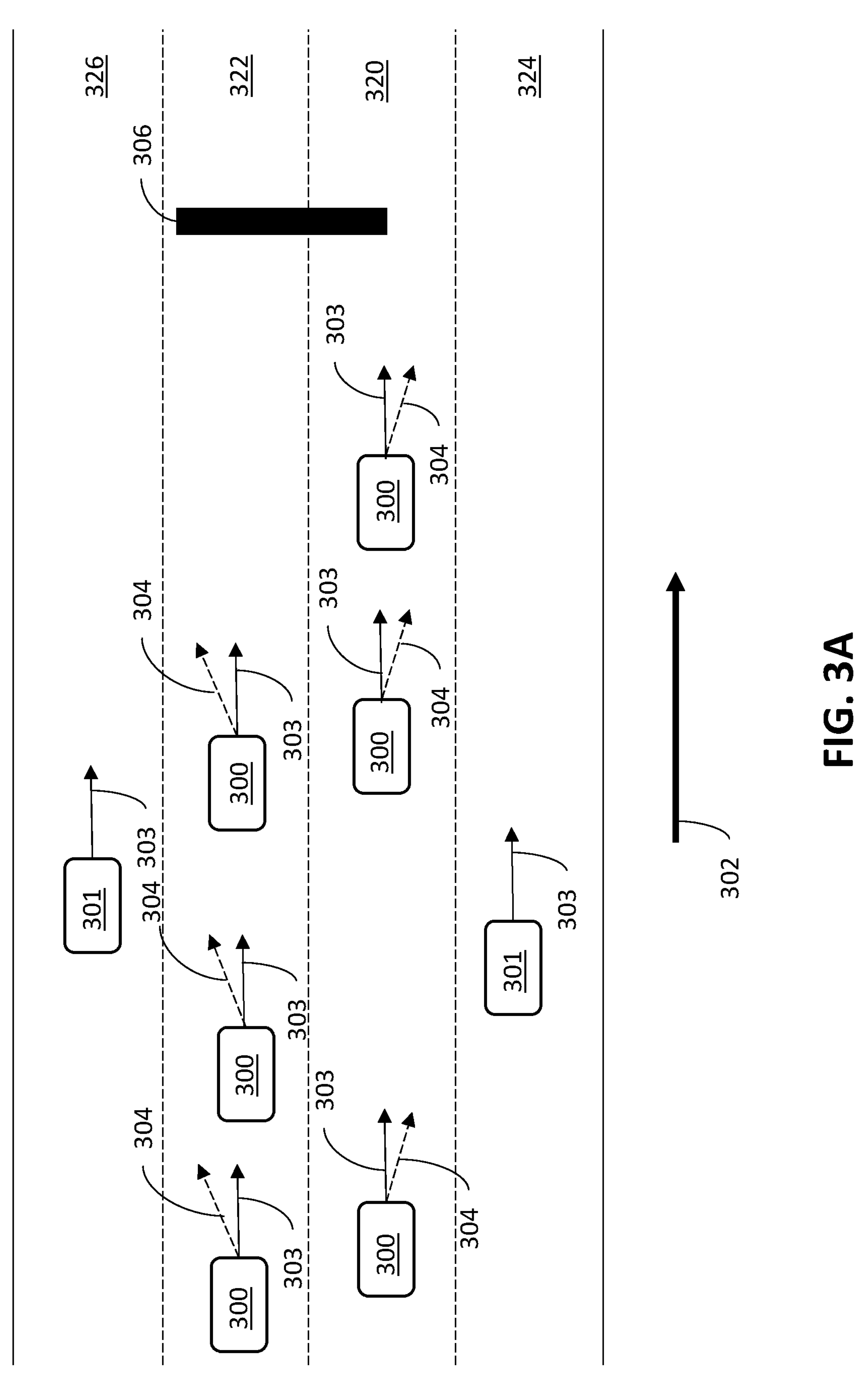
FIGS. 3A and 3B illustrate examples of unusual NPC behavior according to some aspects of the disclosed technology.

Referring first to FIG. 3A, as shown therein, a number of NPCs 300, 301, are traversing a roadway, which is shown for the sake of example as a multi-lane highway having four lanes of traffic traveling in a direction indicated by an arrow 302. Each NPC 300, 301, has a projected trajectory 303 in the same direction as arrow 302, as it would be expected that NPCs traversing the illustrated roadway would continue traveling in the direction of traffic. For each of NPCs 301, projected trajectory 303 is the same as the NPC's realized trajectory, meaning that NPCs 301 are acting in a predictable (and not unusual) manner. In contrast, for each of NPCs 300, projected trajectory 303 is different than a realized trajectory 304 for the NPC due to an object 306 obstructing the lanes of traffic in which NPCs 300 are traveling. From the point of view of an AV that cannot yet see the object 306, the collective behavior of NPCs 300 is unusual and indicative of a collective response to something (in this case, an obstruction across two lanes of traffic).

Figure 3B:
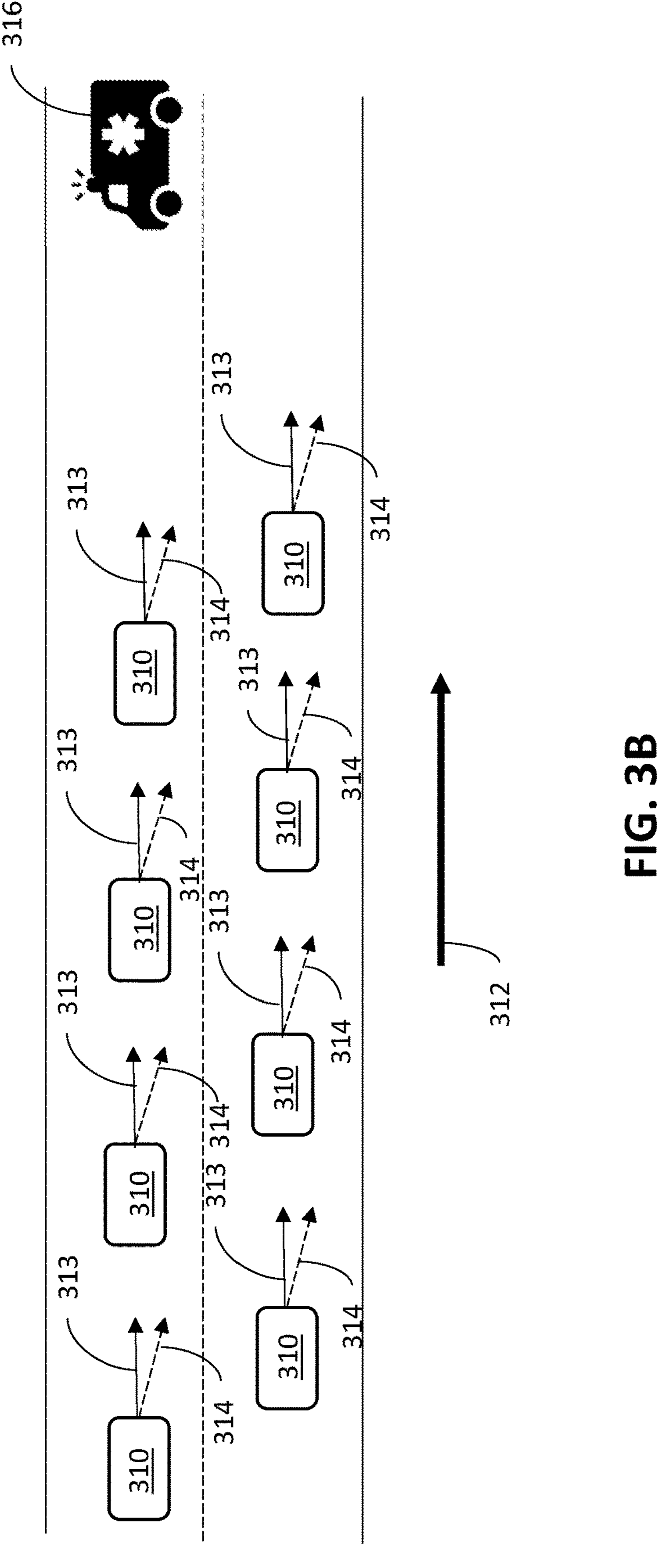

Referring now to FIG. 3B, as shown therein, a number of NPCs 310 are traversing a roadway, which is shown for the sake of example as a multi-lane road having two lanes of traffic traveling in a direction indicated by an arrow 312. Each NPC 310 has a projected trajectory 313 in the same direction as arrow 312, as it would be expected that NPCs traversing the illustrated roadway would continue traveling in the direction of traffic. For each of NPCs 310, projected trajectory 313 is different than a realized trajectory 314 for the NPC due to an EMV 316 traveling in one of the lanes in the opposite direction of arrow 312. NPCs 310 are attempting to vacate both lanes and move to a shoulder, for example, to clear the way for EMV 316. From the point of view of an AV that cannot yet detect the EMV 316, the collective behavior of NPCs 310 is unusual and indicative of a collective response to something (in this case, an approaching EMV).

It will be recognized that, although in the scenarios illustrated in FIGS. 3A and 3B, road participants, or NPCs, are presumed to be vehicles (e.g., cars, motorcycles, bicycles, etc.), other road participants, such as pedestrians and/or animals, may also comprise road participants, or NPCs, within the definition of that term as employed herein. The collective phrases road participants and NPCs may refer to any combination of road participants/NPCs (e.g., a group of NPCs including automobiles, motorcycles, and pedestrians) or may refer to a homogenous group of such road participants/NPCs (e.g., a group of NPCs comprising only automobiles). While non-vehicle NPCs may react differently to a potential driving hazard, they may in fact react in ways that the AV may be able to ascertain as unusual under the circumstances, which information may be useful to the AV.

Referring again to FIG. 2, at 204, the unusual behavior detected at 202 (e.g., discrepancies between projected trajectories and realized trajectories of NPCs) may be evaluated or otherwise assessed. For example, a single NPC whose realized trajectory deviates only slightly from the trajectory projected therefor may only be indicative of an erratic driver at the wheel of the NPC; however, a large number of NPCs each having a realized trajectory that deviates significantly from the trajectory protected therefor is likely indicative of a potential driving hazard. It will be noted that in the latter example, even if the collective behavior is not being undertaken to avoid a driving hazard, the sheer weight of the collective behavior may be sufficient that the AV would be wise to follow the lead of the NPCs in the particular situation.

Additionally at 204, the unusual behavior may be evaluated to determine whether the cause of the behavior may be discerned. For example, in the scenario illustrated in FIG. 3A, the fact that only NPCs 300 in lanes 320 and 322 are deviating from their projected trajectories, as well as the manner in which they are deviating, with NPCs in lane 320 merging into a lane 324 and NPCs in lane 322 merging into a lane 326, may provide sufficient indication of an obstruction (e.g., obstruction 306) across lanes 320 and 322.

Still further at 204, the types of NPCs participating in the unusual behavior may be evaluated, with the behavior of certain types of NPCs (e.g., vehicles similar to AV) being weighted more heavily or differently than other types of NPCs (e.g., human or animal NPCs). Moreover, the sheer number of NPCs participating in a particular form of unusual behavior may be evaluated, with greater weight being afforded an unusual behavior in which a great number (e.g., more than a minimum threshold number) of NPCs are exhibiting than an unusual behavior in which only one or two NPCs are exhibiting.

Additionally and/or alternatively, the angles of the NPCs that are collectively doing different things may be considered. For instance, if all front NPCs are deviating, then it is likely that the EMV or hazard is approaching from and/or located in front of the AV. Conversely, if all rear NPCs are deviating, it is likely that the EMV or hazard are approaching from and/or located behind the AV. This can also give the AV a sense of where the risk is approaching, which sense can be considered in determining what proactive steps should be taken by the AV.

At 206, a safety response to the situation is initiated and/or executed based on the detected unusual behavior and/or the evaluation. Safety responses may include proactively triggering remote assistance (RA), performing a safe stop, mimicking surrounding NPCs (e.g., the NPCs exhibiting the unusual behavior detected at 202) so long as the NPCs are other vehicles, and/or combinations of the foregoing actions. Proactively triggering RA is beneficial in that it may expedite resolution of the situation and perhaps prevent a negative consequence from occurring in response to a driving hazard. Performing a safe stop could be accomplished autonomously or with the assistance of RA and provides the benefit of keeping the AV safe while waiting for the detected potential safety hazard to clear. Mimicking the behavior of surrounding NPCs provides the benefit of allowing the AV to leverage the collective situational awareness and intelligence of nearby NPCs. In particular embodiments, the response or responses initiated and/or executed at 206 may be dependent on one or more factors, including, for example, a type of scenario detected as a result of 204 and/or the number of NPCs exhibiting the detected unusual behavior; in other embodiments, the same response or combination of responses may be initiated and/or executed regardless of the scenario.

At optional 208, some or all of the data collected in connection with the potential driving hazard may be logged and used for future model training purposes and/or for other types of risk management analysis in connection with the AV and/or the fleet to which AV belongs.

Although the operations of the example method shown in and described with reference to FIG. 2 are illustrated as occurring once each and in a particular order, it will be recognized that the operations may be performed in any suitable order and repeated as desired. Additionally, one or more operations may be performed in parallel. Furthermore, the operations illustrated in FIG. 2 may be combined or may include more or fewer details than described.

Example Processor-Based System

Figure 4:
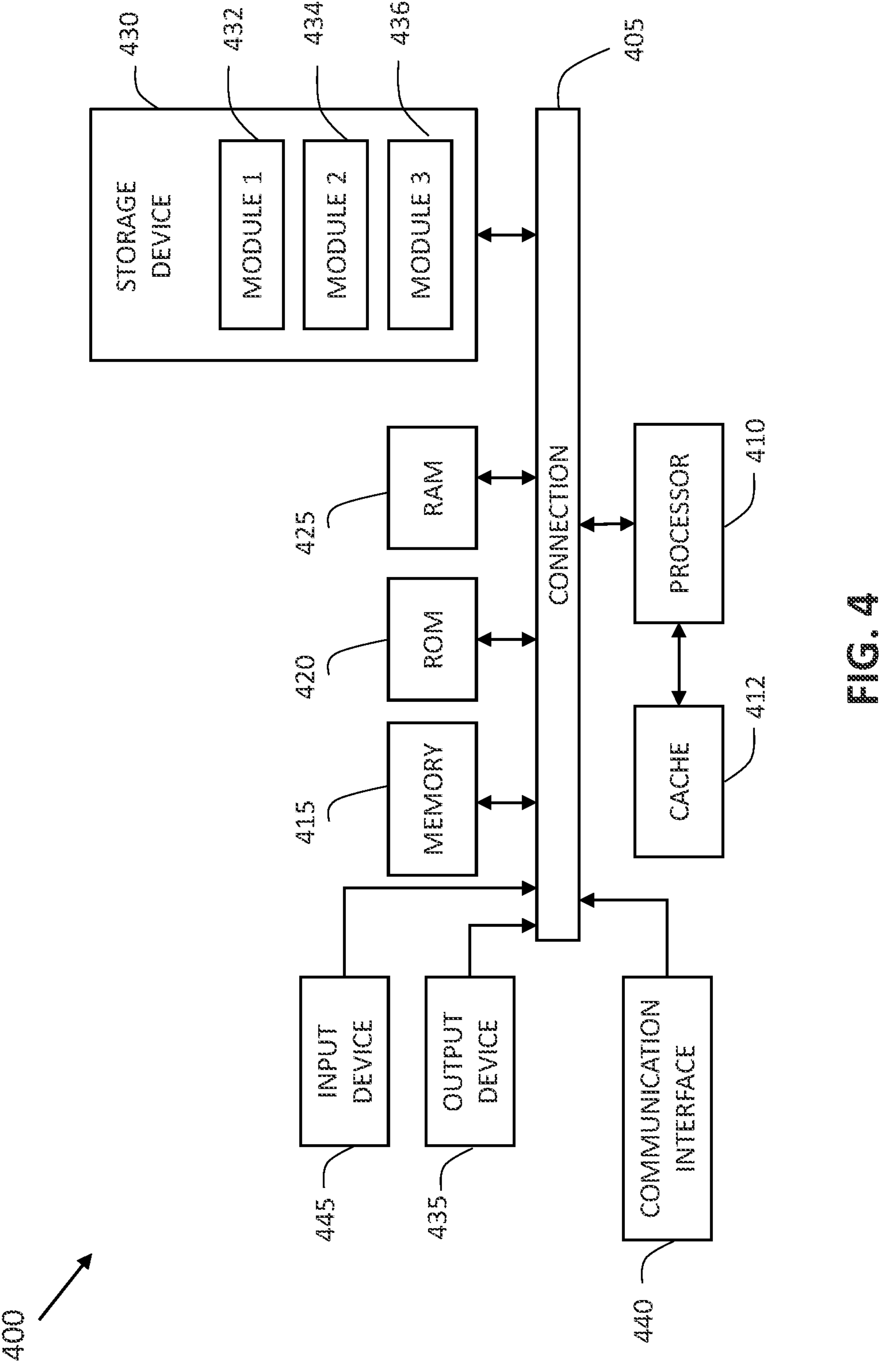
FIG. 4 illustrates an example processor-based system with which some aspects of the disclosed technology can be implemented.

FIG. 4 illustrates an example processor-based system with which some aspects of the subject technology can be implemented. For example, the processor-based system may comprise all or any portion of local computing device 110 (FIG. 1). For example, processor-based system 400 can be any computing device making up, or any component thereof in which the components of the system are in communication with each other using connection 405. Connection 405 can be a physical connection via a bus, or a direct connection into processor 410, such as in a chipset architecture. Connection 405 can also be a virtual connection, networked connection, or logical connection.

In some embodiments, computing system 400 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 400 includes at least one processing unit (Central Processing Unit (CPU) or processor) 410 and connection 405 that couples various system components including system memory 415, such as Read-Only Memory (ROM) 420 and Random-Access Memory (RAM) 425 to processor 410. Computing system 400 can include a cache of high-speed memory 412 connected directly with, in close proximity to, or integrated as part of processor 410.

Processor 410 can include any general purpose processor and a hardware service or software service, such as services, or modules, 432, 434, and 436 stored in storage device 430, configured to control processor 410 as well as a special purpose processor where software instructions are incorporated into the actual processor design. Instructions for performing operations illustrated in FIG. 2 may be implemented as one or more of modules 432, 434, 436. For example, one of modules 432, 434, 436, may comprise an unknown driving hazard detection module and another one of modules 432, 434, 436, may comprise an unknown driving hazard response module. Processor 410 may essentially be a completely self-contained computing system, containing multiple cores or processors, a bus, memory controller, cache, etc. A multi-core processor may be symmetric or asymmetric.

To enable user interaction, computing system 400 includes an input device 445, which can represent any number of input mechanisms, such as a microphone for speech, a touch-sensitive screen for gesture or graphical input, keyboard, mouse, motion input, speech, etc. Computing system 400 can also include output device 435, which can be one or more of a number of output mechanisms known to those of skill in the art. In some instances, multimodal systems can enable a user to provide multiple types of input/output to communicate with computing system 400. Computing system 400 can include communications interface 440, which can generally govern and manage the user input and system output. The communication interface may perform or facilitate receipt and/or transmission wired or wireless communications via wired and/or wireless transceivers, including those making use of an audio jack/plug, a microphone jack/plug, a USB port/plug, an Apple® Lightning® port/plug, an Ethernet port/plug, a fiber optic port/plug, a proprietary wired port/plug, a Bluetooth® wireless signal transfer, a Bluetooth® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, WLAN signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 440 may also include one or more GNSS receivers or transceivers that are used to determine a location of the computing system 400 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 430 can be a non-volatile and/or non-transitory and/or computer-readable memory device and can be a hard disk or other types of computer-readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid state memory, a Compact Disc Read-Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Static RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 430 can include software services, servers, services, etc., that when the code that defines such software is executed by the processor 410, it causes the system 400 to perform a function. In some embodiments, a hardware service that performs a particular function can include the software component stored in a computer-readable medium in connection with the necessary hardware components, such as processor 410, connection 405, output device 435, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network personal computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

SELECTED EXAMPLES

Example 1 provides a system installed on an autonomous vehicle (AV), the system comprising an unknown driving hazard detection module configured to detect an unusual driving behavior of at least one NPC operating in proximity to the AV, wherein the unusual driving behavior comprises a deviation from a behavior of the at least one NPC as predicted by the AV; and an unknown driving hazard response module configured to cause an action to be performed in connection with the AV based on the detected unusual driving behavior.

Example 2 provides the system of example 1, wherein the at least one NPC comprises a plurality of NPCs operating in proximity to the AV.

Example 3 provides the system of example 2, wherein the unknown driving hazard detection module is further configured to detect unusual driving behavior of the plurality of NPCs.

Example 4 provides the system of any of examples 1-3, wherein each at least one NPC has associated therewith a projected trajectory and a realized trajectory, and wherein the detected unusual behavior comprises a discrepancy between the projected trajectory and the realized trajectory.

Example 5 provides the system of any of examples 1-4, wherein the action comprises at least one of triggering a remote assistance (RA) session, initiating a safe stop of the AV, and mimicking a driving behavior of the at least one NPC.

Example 6 provides the system of any of examples 1-5, wherein the action comprises a combination of triggering a remote assistance (RA) session, initiating a safe stop of the AV, and mimicking a driving behavior of the at least one NPC.

Example 7 provides the system of any of examples 1-6, wherein the at least one NPC comprises a vehicle.

Example 8 provides the system of any of examples 1-7, wherein the unknown driving hazard detection module is further configured to evaluate the detected unusual driving behavior, and wherein the action to be performed in connection with the AV is based on results of the evaluation.

Example 9 provides the system of example 8, wherein the at least one NPC comprises a number of NPCs and wherein the evaluating comprises at least one of determining the number of NPCs comprising the at least one NPC and quantifying the detected unusual driving behavior.

Example 10 provides a method for implementation by an onboard computer installed on an autonomous vehicle (AV), the method comprising detecting an unusual driving behavior of a plurality of NPCs operating in proximity to the AV, wherein for each of the NPCs, the unusual driving behavior comprises a deviation from a behavior of the NPC as predicted by the AV; and initiating a responsive action in connection with the AV based on the detected unusual driving behavior of the NPCs.

Example 11 provides the method of example 10, wherein each of the NPCs has associated therewith a projected trajectory and a realized trajectory, and wherein the detected unusual behavior for the NPC comprises a discrepancy between the projected trajectory and the realized trajectory.

Example 12 provides the method of any of examples 10-11, wherein the responsive action comprises at least one of triggering a remote assistance (RA) session, initiating a safe stop of the AV, and mimicking a driving behavior of a majority of the NPCs.

Example 13 provides the method of any of examples 10-12, wherein the responsive action comprises a combination of triggering a remote assistance (RA) session, initiating a safe stop of the AV, and mimicking a driving behavior of a majority of the NPCs.

Example 14 provides the method of any of examples 10-13, further comprising evaluating the detected unusual driving behavior, and wherein the responsive action to be performed in connection with the AV is based on results of the evaluation.

Example 15 provides the method of example 14, wherein the evaluating comprises at least one of determining a number of the NPCs and quantifying the detected unusual driving behavior.

Example 16 provides the method of any of examples 10-15, further comprising logging data regarding at least one of the detected unusual behavior and the responsive action.

Example 17 provides the method of example 16, further comprising using the logged data to train a module for use in controlling operation of the AV.

Example 18 provides one or more non-transitory computer-readable storage media comprising instructions for execution that, when executed by a processor, are operable to cause to be performed operations in connection with an autonomous vehicle (AV) comprising detecting an unusual driving behavior of a plurality of NPCs operating in proximity to the AV, wherein for each of the NPCs, the unusual driving behavior comprises a deviation from a behavior of the NPC as predicted by the AV; evaluating the detected unusual driving behavior, wherein the evaluating comprises at least one of determining a number of the NPCs and quantifying the detected unusual driving behavior; and initiating a responsive action in connection with the AV based on the detected unusual driving behavior of the NPCs and results of the evaluating.

Example 19 provides the one or more non-transitory computer-readable storage media of example 18, wherein each of the NPCs has associated therewith a projected trajectory and a realized trajectory, and wherein the detected unusual behavior for the NPC comprises a discrepancy between the projected trajectory and the realized trajectory.

Example 20 provides the one or more non-transitory computer-readable storage media of any of examples 18-19, wherein the responsive action comprises at least one of triggering a remote assistance (RA) session, initiating a safe stop of the AV, and mimicking a driving behavior of a majority of the NPCs.

Example 21 provides the one or more non-transitory computer-readable storage media of any of examples 18-20, wherein each of the road participants comprises a road participant selected from a group consisting of an automobile, a motorcycle, a bicycle, and a pedestrian.

OTHER IMPLEMENTATION NOTES, VARIATIONS, AND APPLICATIONS

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the interior electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as exterior storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended examples. The specifications apply only to one non-limiting example and, accordingly, they should be construed as such. In the foregoing description, example embodiments have been described with reference to particular arrangements of components. Various modifications and changes may be made to such embodiments without departing from the scope of the appended examples. The description and drawings are, accordingly, to be regarded in an illustrative rather than in a restrictive sense.

Note that with the numerous examples provided herein, interaction may be described in terms of two, three, four, or more components; however, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this Specification.

Various operations may be described as multiple discrete actions or operations in turn in a manner that is most helpful in understanding the example subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended examples. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the examples appended hereto, Applicant wishes to note that the Applicant: (a) does not intend any of the appended examples to invoke paragraph (f) of 35 U.S.C. Section 112 as it exists on the date of the filing hereof unless the words "means for" or "step for" are specifically used in the particular examples; and (b) does not intend, by any statement in the Specification, to limit this disclosure in any way that is not otherwise reflected in the appended examples.

What is claimed is:

1. One or more non-transitory computer-readable storage media comprising instructions for execution that, when executed by a processor, are operable to cause the processor to perform operations in connection with an autonomous vehicle (AV) comprising:

detecting an unusual driving behavior of a plurality of road participants operating in proximity to the AV, wherein for each of the road participants, the unusual driving behavior comprises a deviation from a behavior of the plurality of road participants as predicted by the AV, the deviation indicating a collective response to a potential hazard not yet detected by the AV;

evaluating the detected unusual driving behavior, wherein the evaluating comprises at least one of determining a number of the road participants and quantifying the detected unusual driving behavior; and initiating a responsive action in connection with the AV based on the detected unusual driving behavior of the road participants and results of the evaluation, wherein the responsive action comprises mimicking a driving behavior of a majority of the road participants.

2. The one or more non-transitory computer-readable storage media of claim 1, wherein each of the plurality of road participants has associated therewith a projected trajectory and a realized trajectory, and wherein the detected unusual driving behavior comprises a discrepancy between the projected trajectory and the realized trajectory.

3. The one or more non-transitory computer-readable storage media of claim 1, wherein the responsive action further comprises at least one of triggering a remote assistance (RA) session or initiating a safe stop of the AV.

4. The one or more non-transitory computer-readable storage media of claim 1, wherein each of the plurality of road participants comprises at least one of an automobile, a motorcycle, a bicycle, or a pedestrian.

5. A method for implementation by an onboard computer installed on an autonomous vehicle (AV), the method comprising:

predicting short term trajectories of a plurality of road participants operating in proximity to the AV;

comparing the predicted short term trajectories of the plurality of road participants with realized trajectories of the plurality of road participants operating in proximity to the AV to detect a collective unusual driving behavior of the plurality of road participants, wherein the collective unusual driving behavior comprises detected discrepancies between the predicted short term trajectories of a subset of the plurality of road participants and the realized trajectories of the subset of the plurality of road participants, the detected collective unusual driving behavior indicating a collective response to a potential hazard not yet detected by the AV; and initiating a responsive action in connection with the AV based on the detected collective unusual driving behavior, wherein the responsive action comprises mimicking a driving behavior of a majority of the road participants.

6. The method of claim 5, wherein the subset of the plurality of road participants comprises a majority of the plurality of road participants.

7. The method of claim 5, wherein the responsive action further comprises at least one of triggering a remote assistance (RA) session or initiating a safe stop of the AV.

8. The method of claim 5, wherein the responsive action further comprises a combination of triggering a remote assistance (RA) session and mimicking the driving behavior of the majority of the road participants.

9. The method of claim 5, further comprising evaluating the detected collective unusual driving behavior, and wherein the responsive action to be performed in connection with the AV is based on results of the evaluation.

10. The method of claim 9, wherein the evaluating comprises at least one of determining a number of the plurality of road participants and quantifying the detected collective unusual driving behavior.

11. The method of claim 5, further comprising logging data regarding at least one of the detected collective unusual driving behavior or the responsive action.

12. The method of claim 11, further comprising using the logged data to train a module for use in controlling operation of the AV.

13. A system installed on an autonomous vehicle (AV), the system comprising:

an unknown driving hazard detection module configured to detect an unusual driving behavior of a plurality of road participants operating in proximity to the AV, wherein the unusual driving behavior comprises a deviation from a behavior of the plurality of road participants as predicted by the AV, the deviation indicating a collective response to a potential hazard not yet detected by the AV; and an unknown driving hazard response module configured to determine a responsive action to be performed in connection with the AV based on the detected unusual driving behavior and to cause the AV to perform the responsive action, wherein the responsive action comprises at least mimicking a driving behavior of a majority of the road participants.

14. The system of claim 13, wherein the unknown driving hazard detection module resides on the AV.

15. The system of claim 13, wherein each of the plurality of road participants has associated therewith a projected trajectory and a realized trajectory, and wherein the detected unusual driving behavior comprises a discrepancy between the projected trajectory and the realized trajectory.

16. The system of claim 13, wherein the responsive action further comprises at least one of triggering a remote assistance (RA) session or initiating a safe stop of the AV.

17. The system of claim 13, wherein the responsive action further comprises a combination of triggering a remote assistance (RA) session and mimicking the driving behavior of the majority of the road participants.

18. The system of claim 13, wherein each of the plurality of road participants comprises at least one of an automobile, a motorcycle, a bicycle, or a pedestrian.

19. The system of claim 13, wherein the unknown driving hazard detection module is further configured to evaluate the detected unusual driving behavior, and wherein the responsive action to be performed in connection with the AV is based on results of the evaluation.

20. The system of claim 19, wherein evaluating the detected unusual driving behavior comprises at least one of determining a number of the plurality of road participants and quantifying the detected unusual driving behavior.

* * * * *